United States Patent [19]

Chin et al.

[11] Patent Number: 5,194,500

[45] Date of Patent: Mar. 16, 1993

[54] STYRENE-ISOPRENE THREE-ARMED HIGH LOAD BEARING CAPACITY BLOCK COPOLYMER COMPOSITION FOR ADHESIVES

[75] Inventors: Steven S. Chin; David J. St. Clair, both of Houston, Tex.; Richard L. Talbott, White Bear Township, Ramsey County, Minn.

[73] Assignee: Shell Oil Company, Houston, Tex.

[21] Appl. No.: 843,884

[22] Filed: Feb. 28, 1992

[51] Int. Cl.$^5$ .............................................. C08L 53/02
[52] U.S. Cl. .................................... 525/97; 525/98; 525/99; 525/267; 525/272
[58] Field of Search ................... 525/98, 267, 272, 97, 525/99

[56] References Cited

U.S. PATENT DOCUMENTS

| | | | |
|---|---|---|---|
| 3,239,478 | 3/1966 | Harlan, Jr. | 260/27 |
| 3,658,740 | 4/1972 | Marrs et al. | 260/27 |
| 3,753,936 | 8/1973 | Marrs | 260/27 R |
| 3,935,338 | 1/1976 | Robertson et al. | 427/207 |

OTHER PUBLICATIONS

"New Anionic Syntheses of Star-Branched Polymers" by R. P. Quirk et al., Polymer Preprints, vol. 29, No. 2, Sep. 1988, American Chemical Society.
"Dilithium Initiators Based on 1,3-bis(1-Phenylethenyl)benzene. Tetrahydrofuran and Lithium sec-Butoxide Effects" by R. P. Quirk et al., Polymer International, vol. 24, No. 4, (1991), pp. 197-206.

*Primary Examiner*—Jacob Ziegler
*Attorney, Agent, or Firm*—Donald F. Haas

[57] ABSTRACT

An adhesive which contains a tackifying resin and a branched three-armed block copolymer composition comprised of polymeric blocks wherein the molecular weight is from about 180,000 to about 250,000, the polystyrene content is from about 17 to about 23% by weight of the block copolymer composition and the percentage of S-I arms which are load bearing is greater than about 85%.

6 Claims, No Drawings

STYRENE-ISOPRENE THREE-ARMED HIGH LOAD BEARING CAPACITY BLOCK COPOLYMER COMPOSITION FOR ADHESIVES

BACKGROUND OF THE INVENTION

This invention relates to a novel block copolymer composition for use in adhesives. More particularly, it relates to branched three-armed styrene-isoprene block copolymer compositions comprised of polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, i.e. 5-30% the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A)—called domains. Since the A—B—A block copolymers have two A blocks separated by a B block, domain formation results in effectively locking the B blocks and their inherent entanglements in place by the A blocks and forming a network structure at normal use temperature.

These alkenyl arene domains act as physical cross-links anchoring the ends of many block copolymer chains. Such a phenomenon allows the A—B—A rubber to behave like a conventionally vulcanized rubber in the unvulcanized state and is applicable for various uses. For example, these network forming polymers are applicable for uses such as in adhesive formulations; in molded shoe soles; as an impact modifier for polystyrene resins and engineering thermoplastics; for modification of asphalt; etc.

Styrenic block copolymers are widely used to make pressure sensitive adhesives for a wide variety of uses including tapes, labels and product assembly applications. Pressure sensitive adhesives based on styrenic block copolymers such as KRATON ® thermoplastic rubber provide excellent adhesion to a wide variety of substrates, including paper, cardboard and other cellulosic materials. For instance, U.S. Pat. Nos. 3,239,478 and 3,935,338, which are herein incorporated by reference, disclose how to make pressure sensitive adhesives of this type. They include examples of linear S—I—S polymers, the latter at col.5 describes a polymer with a polystyrene content of 14% and a molecular weight of 145,000. High holding power in a shear test is important in such adhesives because this is a function of the load bearing capability of the adhesive, an important feature in packaging applications, for example. Thus, it would be advantageous to have available an adhesive with higher shear holding power than is presently available and also processable as a thermoplastic (melt viscosity less than 500 Pa-s at 177° C.).

SUMMARY OF THE INVENTION

The present invention relates to branched three-armed styrene-isoprene block copolymer compositions comprised of polymeric blocks. These compositions can be used in pressure sensitive adhesives. The compositions are characterized in that the percentage of S—I arms which are load bearing must be greater than 85% to give the polymer high cohesive strength. The polystyrene content must be from 17 to 23% to insure adequate adhesion properties. The polystyrene equivalent molecular weight ($M_s$) as measured by Gel Permeation Chromatography (GPC) must be 180,000 to 250,000 to insure proper viscosity in the adhesive. The present invention also encompasses a pressure sensitive adhesive composition comprising the above block copolymer composition and a tackifying resin.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in each arm of the copolymers of this invention are linear.

Polymers containing ethylenic unsaturation or both aromatic and ethylenic unsaturation may be prepared using free-radical, cationic or anionic initiators. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as branched $(S—I)_3$ block copolymers are frequently prepared in solution using anionic polymerization techniques. The branched block copolymers may have three arms with the following structure where X is a coupling agent:

$(SI)_3$—X

This type of branched polymer may also be made without a coupling agent. Such polymers can be made with trifunctional initiators such that all three arms of the polymer grow outwardly from the initiator. Such polymers have the formula:

$(SI)_3$

The S in the above formula usually stands for a polystyrene block but other alkenyl aromatic hydrocarbon monomers may be used including vinyl aryl compounds such as various alkyl-substituted styrenes, alkoxy-substituted styrenes, 2-vinyl pyridine, 4-vinyl pyridine, vinyl naphthalene, alkyl-substituted vinyl naphthalenes and the like. For simplicity herein, the terms styrene, polystyrene content and polystyrene equivalent molecular weight are used but such terms are intended to include these other alkenyl aromatic hydrocarbons. The conjugated diene which is used herein must be isoprene and the type of isoprene polymerization technique which must be used is that in which the stereochemistry is adjusted so that predominantly cis-1,4-polyisoprene having a glass transition temperature of less than $-50°$ C. as measured by differential scanning calorimetry at a 10° C. per minute temperature scan rate is produced. This type of polyisoprene polymerization should be used because otherwise the polymer may not be compatible with the tackifying resin.

In general, when solution anionic techniques are used, such (S—I)$_3$ block copolymers are prepared by contacting the monomers to be polymerized simultaneously or sequentially with an organoalkali metal compound in a suitable solvent at a temperature within the range from about $-100°$ C. to about 150° C., preferably at a temperature within the range from about 0° C. to about 100° C. Particularly effective anionic polymerization initiators are organolithium compounds having the general formula:

$$RLi_n$$

wherein:

R is an aliphatic, cycloaliphatic, aromatic or alkyl-substituted aromatic hydrocarbon radical having from 1 to about 20 carbon atoms; and n is an integer of 1 to 3.

In general, any of the solvents known in the prior art to be useful in the preparation of such polymers may be used. Suitable solvents include straight- and branched-chain hydrocarbons such as pentane, hexane, heptane, octane and the like, as well as alkyl-substituted derivatives thereof; cycloaliphatic hydrocarbons such as cyclopentane, cyclohexane, cycloheptane and the like, as well as alkyl-substituted derivatives thereof; aromatic and alkyl-substituted aromatic hydrocarbons such as benzene, toluene, xylene and the like; hydrogenated aromatic hydrocarbons, such as tetralin, decalin and the like. Linear and cyclic ethers such as dimethyl ether, methyl ethyl ether, anisole, tetrahydrofuran and the like may be used in small amounts.

As described in U.S. Pat. No. 4,096,203, the disclosure of which is herein incorporated by reference, the styrene may be contacted with the initiator. Next, the living polymer in solution is contacted with isoprene. The resulting living polymer has a simplified structure A—B—Li. It is at this point that the living polymer is coupled. Coupling is normally only used when a monofunctional initiator is used.

There is a wide variety of coupling agents that can be employed. Any polyfunctional coupling agent which contains three reactive sites can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups and the like. Various other substituents which are inert in the coupling reaction can be present such as hydrocarbon radicals as exemplified by the alkyl, cycloalkyl, aryl, aralkyl and alkaryl groups and the alkoxy, aryloxy, alkythio, arylthio, and tertiary amino groups. Many suitable types of these polyfunctional compounds have been described in U.S. Pat. Nos. 3,595,941; 3,468,972, 3,135,716; 3,078,254, and 3,594,452, the disclosures of which are herein incorporated by reference. When the coupling agent has two reactive sites such as dibromoethane, the polymer will have a linear AB—BA structure. When the coupling agent has three reactive sites, such as trisnonylphenylphosphite (TNPP), the polymer will have a branched structure, such as (A—B)$_3$—P. Since the present block copolymers are predominantly branched with three arms, a coupling agent with three reactive sites must be used. Other phosphite coupling agents which can be used include trimethyl phosphite and triethyl phosphite. Silane coupling agents which can be used include methyl trichlorosilane, methyl trimethoxy silane and γ-glycidoxy propyl trimethoxysilane.

In the prior art, such as that exemplified by U.S. Pat. Nos. 3,595,941 and 3,468,972 the effort was always made to select the particular coupling agent or reaction conditions that resulted in the highest coupling efficiency. High coupling efficiency is desired herein in order to produce strong adhesive compositions. Coupling efficiency is defined as the mass of coupled polymer divided by the mass of coupled polymer plus the mass of uncoupled polymer. The coupling efficiency herein refers to that of the original polymer not including any degradation fragments formed during processing. Thus, when producing an (SI)$_3$ branched polymer, the coupling efficiency is shown by the following relationship:

$$\frac{\text{mass of coupled polymer}}{\text{mass of (uncoupled + coupled polymer)}} \times 100$$

Coupling efficiency can be determined theoretically from the stoichiometric quantity of coupling agent required for complete coupling or coupling efficiency can be measured by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%.

Less than maximum coupling efficiency can be achieved by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, react very quickly and could easily be employed to cut short complete coupling of the polymers. In addition, by performing the coupling reaction at elevated temperatures, such as above about 90° C., thermal termination of many of the living polymer groups (A—B—Li) occurs prior to coupling. The typical coupling conditions include a temperature of between about 65° C. to about 75° C. and sufficient pressure to maintain the reactants in a liquid phase.

As stated above, polymers within the scope of the present invention can also be made without coupling by utilizing a trifunctional initiator. In this type of reaction, the polymer arms grow outwardly from the initiator and one polymer is made rather than making more than one polymer and coupling them together. Suitable trifunctional initiators for use herein are prepared from the reaction of one equivalent of 1,3,5-tris (1-phenylethenyl) benzene with three equivalents of sec-butyl lithium according to the procedures described in "New Anionic Syntheses of Star-Branched Polymers" by R. P. Quirk, S-H Guo, M. Alsamarraie and F. Ignatz-Hoover, *Polymer Preprints, Volume* 29, pages 298-299 (Sep. 1988) and "Dilithium Initiatiors Based on 1,3,5-bis (1-phenylethenyl) benzene. Tetrahydrofuran and Lithium sec—Butoxide Effects" by R. P. Quirk and J-J. Ma, *Polymer International,* 24, pages 197-206 (1991) for difunctional initiators.

Following the coupling reaction or when the desired coupling efficiency has been obtained or when the trifunctional initiator - initiated reaction is complete, the product is neutralized such as by the addition of terminators, e.g. water, alcohol or other reagents, for the purpose of removing the lithium radical forming the nucleus for the condensed polymer product. The product is then recovered such as by coagulation utilizing hot water or steam or both.

As discussed above, it is desired that the pressure sensitive adhesive formulation exhibit good adhesion, i.e. a rolling ball tack of less than 5 cm, and have a melt viscosity appropriate for such adhesives, i.e. less than 500 Pa-s, and a shear holding power to Kraft of greater than 2000 minutes. The present invention provides a composition and an adhesive which satisfies these requirements and is particularly useful in packaging applications. The composition is a branched three armed (S—I)$_3$ block copolymer composition which is comprised of polymeric blocks combined with a tackifying resin. In order to achieve the standards set forth above, the polymer compositions of the present invention must have the following characteristics:

(1) a percentage of S—I arms which are load bearing of greater than 85%, (2) a polystyrene content (PSC) of 17 to 23% by weight, and (3) a molecular weight ($M_s$—polystyrene equivalent peak molecular weight measured by gel permeation chromatography) of 180,000 to 250,000. Alkenyl aromatic hydrocarbons other than styrene may be used but for convenience herein, this molecular weight will be referred to as polystyrene equivalent molecular weight throughout.

It has been determined that if the compositions do not have the above characteristics, then the adhesion, melt viscosity and high shear holding power criteria cannot be met. However, if the composition does have the above characteristics, then the adhesion, melt viscosity and high shear holding power criteria are satisfied.

If the polystyrene content is less than 17%, the shear holding power of the adhesives made from the composition is poor and if it is more than 23%, the tack is too low. If the total molecular weight is greater than 250,000, then the melt viscosity is too high and if it is less than 180,000, the shear holding power is too low.

The percentage of S—I arms which are load bearing refers to the percentage in the polymer before it is processed into a hot melt adhesive. Any polyisoprene-containing block polymer that does not have a polystyrene block on at least the two ends is not load bearing, i.e. it will not contribute to the high shear holding power and high cohesion characteristics of the polymer. Simplifying somewhat, if the polymer has a percentage of S—I arms which are load bearing of 90%, this means that 90% of the polymer is made up of S—I—S linkages or some other such linkage in which the styrene is present on at least the two ends. When a polymer is made by the coupling process, the coupling efficiency of the polymer is the percentage of S—I arms which are load bearing. Since trifunctional initiated polymers are not made by coupling, coupling efficiency has no meaning in that context. In the case of trifunctional initiated polymers, the percentage of S—I arms which are load bearing is the percentage of polyisoprene arms which become capped with polystyrene blocks in the polymer synthesis.

The concentration of the initiator can be regulated to control the molecular weight of the overall composition and of the polystyrene blocks. Generally, the initiator concentration is in the range of about 0.25 to about 50 millimoles per 100 grams of styrene monomer. The required initiator level frequently depends upon the solubility of the initiator in the hydrocarbon diluent. The ratio of the initiator to the monomer determines the block size, i.e. the higher the ratio of initiator to monomer the smaller the molecular weight of the block.

Methods of controlling the molecular weights of the blocks and the overall polymer are quite well known. For instance, such are disclosed in U.S. Pat. No. 3,149,182, which states that the amount of monomer can be kept constant and different molecular weights can be achieved by changing the amount of catalyst or the amount of catalyst can be kept constant and different molecular weights can be achieved by varying the amount of the monomer, and in U.S. Pat. No. 3,231,635, the disclosures of which are herein incorporated by reference, and many others. A typical 3-armed block copolymer composition within the scope of the present invention, having a coupling efficiency of 86%, a polystyrene block molecular weight of 12,000, a polystyrene content of 21% by weight and an overall molecular weight ($M_s$) of 226,000, was prepared by polymerizing styrene with secondary butyl lithium as initiator at a monomer to initiator molar ratio of 115 to 1, polymerizing isoprene with this polystyryl lithium as initiator at a monomer to initiator molar ratio of 672 to 1 and then coupling this polystyrene-polyisoprenyl lithium diblock with a trifunctional coupling agent.

It is necessary to add an adhesion promoting or tackifying resin that is compatible with the elastomeric conjugated diene block. A common tackifying resin is a diene-olefin copolymer of piperylene and 2-methyl-2-butene having a softening point of about 95° C. This resin is available commercially under the tradename Wingtack ® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C. ("Standard Test Method for Softening Point by Ring-and-Ball Apparatus"; reference: 1989 Annual Book of ASTM Standards, Volume 6,D3, page 520—ASTM Number E28-67, 1982).

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicyclopentadiene resin such as Escorez ® 5000 series resin made by Exxon Chemical Co. or a hydrogenated polystyrene or polyalphamethylstyrene resin such as Regalrez ® resin made by Hercules, Inc.

The amount of adhesion promoting resin employed varies from about 50 to about 200 parts by weight per hundred parts rubber (phr), preferably between about 100 to about 150 phr. The selection of the particular tackifying agent is, in large part, dependent upon the specific block copolymer employed in the respective adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco Chemical Company, and oils with relatively low aromatics content, e.g. SHELLFLEX ® 371 oil made by Shell Oil Company.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and storage of the adhesive composition.

Additional stabilizers known in the art may also be incorporated into the adhesive composition. These may be for protection during the useful life of the product against, for example, oxygen, ozone and ultra-violet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend without undue degradation is satisfactory.

The resultant adhesives may be used in a wide variety of pressure sensitive applications. A particularly preferred application is their use in packaging tapes. Other uses include a wide variety of tapes, labels and assembly adhesives. Another important advantage of the compositions of the present invention is that they give much better shear holding power than similarly made polymers which also meet the industry standards. This is shown in the examples.

In the following examples, the coupling efficiency was determined by GPC. The melt viscosity (M.V.) was measured in Pascal-seconds (Pa-s) by using a Brookfield Thermocell viscometer at 177° C. The SAFT Mylar (SAFT-MY) was measured by 1"×1" Mylar to Mylar lap joint with a 1 kg weight. The SAFT Kraft (SAFT-KT) was measured by 1"×1" Mylar to Kraft paper lap joint with a 1 kg weight. SAFT measures the temperature at which the lap shear assembly fails underload in an oven whose temperature is raised at a rate of 40° F. per hour. The molecular weights were peak molecular weights determined by gel permeation chromatography as polystyrene equivalent molecular weight. The polystyrene content was determined by nuclear magnetic resonance spectroscopy. Rolling Ball Tack (RBT) is the distance in centimeters a steel ball rolls on the adhesive film with a standard initial velocity (PSTC test No. 6). Small numbers indicate aggressive tack. Holding Power to steel (HP-ST) or to Kraft paper (HP-KT) is the time required to pull a standard area ($\frac{1}{2}$"×$\frac{1}{2}$") of tape from a standard test surface (steel, Kraft paper) under a standard load (2 kg), in shear at 2° antipeel (PSTC test No. 7). Peel was determined by PSTC test No. 1. Polyken probe tack (PPT) was determined by ASTM D-2979. Loop tack (LT) was determined using TLMI loop tack tester. For HP, Peel, PPT and LT, higher numbers indicate better performance for most pressure sensitive adhesive applications.

EXAMPLE

Polymer A is a polymer commonly used in pressure sensitive adhesive applications. It is a $(SI)_2$—X block copolymer with a coupling efficiency of 82%, a polystyrene content of 14.8% and a molecular weight ($MW_s$) of 220,000. Polymer B is a polymer made according to the present invention by using TNPP as a coupling agent. It is a three-armed branched block copolymer wherein the arms are linear S—I blocks. This $(S—I)_3$—X poly a coupling efficiency of 86%, a polystyrene content of 21% by weight and a molecular weight ($MW_s$) of 228,000. Both polymers were used in the adhesive formulation shown at the bottom of Table 1. Adhesive formulations in Table 1 were dissolved in reagent grade toluene, cast onto 1.0 mil MYLAR ® film to a dried adhesive thickness of approximately 1.5 mils using a doctor blade. Adhesive testing was conducted on dried adhesives according to the methods described above. It can be seen that while most of the adhesive properties of the formulation using Polymer B are somewhat better than those of the other formulation (RBT is somewhat less desirable, probably because of the higher styrene content), the HP-ST is dramatically increased.

TABLE 1

| PSA PROPERTY | POLYMER A | POLYMER B |
| --- | --- | --- |
| RBT, CM | .9 | 1.5 |
| PPT, KG | 1.45 | 1.74 |
| LT, OZ/IN | 65 | 78 |
| PEEL, PLI | 4.7 | 5.0 |
| HP-ST, MIN | 561 | >12000 |
| HP-KT, MIN | 1737 pc/a[1] | 8989 pc/a[1] |
| SAFT-MY, °C. | 101[2]c | 108[2]c |
| SAFT-KT, °C. | 77[3]a | 83[3]a |
| M.V., Pa.S | 140 | 270 |

[1] pc/a means partially cohesive/adhesive.
[2] c means cohesive failure.
Pa · s
[3] a means adhesive failure.
Formulation:
100 parts polymer
100 parts tackifying resin (ESCOREZ 1310 from Exxon Chemical Co.)
10 parts naphthenic oil (SHELLFLEX 371 from Shell Oil Co.)
1 part phenolic antioxidant (IRGANOX 1010 from Ciba-Geigy Corp.)

We claim:

1. A branched three-armed S—I—S block copolymer composition, where S is an alkenyl aromatic hydrocarbon and I is isoprene, comprised of polymeric blocks for use in pressure sensitive adhesives, said block copolymer composition characterized in that
   (a) the molecular weight (as polystyrene equivalent) is from 180,000 to 250,000,
   (b) the polystyrene content is from 17 to 23% by weight of the block copolymer composition and
   (c) the percentage of S—I arms which are load bearing by weight of the block copolymer composition is greater than 85%.
2. The composition of claim 1 wherein S is styrene.

3. A pressure sensitive adhesive comprising the block copolymer composition of claim 1 and a tackifying resin.

4. A predominantly branched S—I—S block-copolymer composition, where S is an alkenyl aromatic hydrocarbon and I is isoprene, comprised of polymeric blocks for use in packaging adhesives which have a rolling ball tack of less than 5 centimeters, a melt viscosity of less than 500 Pa-s at 177° C. and a shear holding power to Kraft of greater than 2,000 minutes, said block copolymer composition characterized in that (a) the molecular weight (as polystyrene equivalent) is from 180,000 to 250,000,
(b) the polystyrene content is from 17 to 23% by weight of the block copolymer composition and
(c) the percentage of S—I arms which are load bearing by weight of the block copolymer composition is greater than 85%.

5. The composition of claim 4 wherein S is styrene.

6. An adhesive comprising the block copolymer composition of claim 4 and a tackifying resin.

* * * * *

UNITED STATES PATENT AND TRADEMARK OFFICE
CERTIFICATE OF CORRECTION

PATENT NO. : 5,194,500
DATED : March 16, 1993
INVENTOR(S) : Steven S. Chin, David J. St. Clair, Richard L. Talbott It is certified that error appears in the above-indentified patent and that said Letters Patent is hereby corrected as shown below:

Title page, item [21], "843,884" should read --843,844--

Signed and Sealed this

Thirty-first Day of May, 1994

Attest:

BRUCE LEHMAN

*Attesting Officer*     *Commissioner of Patents and Trademarks*